United States Patent [19]

Geke et al.

[11] Patent Number: 4,609,488

[45] Date of Patent: Sep. 2, 1986

[54] REGENERATION OF AQUEOUS DEGREASING AND CLEANING SOLUTIONS

[75] Inventors: Jurgen Geke, Duesseldorf; Bernd Stedry, Kempen, both of Fed. Rep. of Germany

[73] Assignee: Henkel Kommanditgesellschaft auf Aktien, Duesseldorf, Fed. Rep. of Germany

[21] Appl. No.: 561,625

[22] Filed: Dec. 15, 1983

[30] Foreign Application Priority Data

Dec. 22, 1982 [DE] Fed. Rep. of Germany ....... 3247431

[51] Int. Cl.$^4$ .......................... B01D 17/04; B08B 7/04; C23G 1/36
[52] U.S. Cl. .................................... 252/344; 252/321; 210/708; 134/10
[58] Field of Search .................. 252/344, 321; 134/10; 210/708

[56] References Cited

U.S. PATENT DOCUMENTS

| | | | |
|---|---|---|---|
| 2,643,979 | 6/1953 | Lindert | 252/344 X |
| 2,759,975 | 8/1956 | Chiddix et al. | 252/344 X |
| 3,205,169 | 9/1965 | Kirkpatrick et al. | 252/344 X |
| 3,364,179 | 1/1968 | Kirkpatrick et al. | 252/344 X |
| 3,585,148 | 6/1971 | Sackis | 252/344 |
| 3,691,086 | 9/1972 | Lees et al. | 252/344 X |
| 3,974,220 | 8/1976 | Heib et al. | 252/344 X |
| 4,029,708 | 6/1977 | Seitz et al. | 260/584 |
| 4,120,815 | 10/1978 | Raman | 252/344 X |
| 4,182,690 | 1/1980 | Suzuki et al. | 252/344 |
| 4,209,422 | 6/1980 | Zimmerman et al. | 252/344 |
| 4,326,968 | 4/1982 | Blair, Jr. | 252/344 X |
| 4,374,734 | 2/1983 | Newcombe | 252/344 X |
| 4,404,362 | 9/1983 | Bellos | 252/344 X |
| 4,409,119 | 10/1983 | Burger et al. | 210/708 X |
| 4,446,054 | 5/1984 | Bessler | 252/344 |

FOREIGN PATENT DOCUMENTS 1509042   4/1978   United Kingdom .

Primary Examiner—John F. Terapane
Assistant Examiner—Catherine S. Kilby
Attorney, Agent, or Firm—Ernest G. Szoke; Henry E. Millson, Jr.; Mark A. Greenfield

[57] ABSTRACT

A process for regenerating and recycling aqueous alkaline or neutral degreasing and cleaning solutions contaminated with emulsified oils by adding thereto cationic surfactants or cationically modified polymers or a combination of cationic surfactants and cationically modified polymers to break the emulsions. The contaminants which precipitate are mechanically separated off and the cleaning solution is thereby regenerated without loss of cleaning efficacy.

7 Claims, No Drawings

REGENERATION OF AQUEOUS DEGREASING AND CLEANING SOLUTIONS

This invention relates to a process for regenerating alkaline and neutral cleaning solutions contaminated predominantly with anionically emulsified mineral and/or natural oils.

BACKGROUND OF THE INVENTION

Aqueous solutions containing surfactants and, optionally, so-called builders, such as alkali hydroxides, alkali carbonates, silicates and phosphates, complexing agents and organic or inorganic corrosion inhibitors, are used for cleaning and degreasing on an industrial scale, more particularly, for cleaning and degreasing metal surfaces. In practical application, these cleaning solutions become contaminated by mineral oil and/or natural oils to which emulsifiers, corrosion inhibitors and other oil additives may be added. These impurities, which are emulsified by any emulsifiers present in the oil and by the surfactants of the cleaning agent in the solution, weaken the effectiveness of the aqueous solutions and, ultimately, render them ineffectual. The solutions then have to be renewed.

Before the used solutions are run off into drains, they have to be freed from oil and, if they are alkaline, neutralized in accordance with applicable government regulations. Neutralization alone is generally not sufficient to remove all the oils. Accordingly, the emulsion has to be broken. This may be done by various methods, for example by reducing the pH-value to approximately 1, by increasing the salt content of the solution, or by adding flocculating agents, such as aluminium or iron salts, in the acidic range, followed by re-neutralization.

The ingredients of the cleaning solution are lost when the cleaning solutions are run off into the drains and also at the effluent treatment stage. Accordingly, it is advantageous to regenerate spent cleaning solutions to enable them to be reused and to prolong the useful life of the baths.

Aqueous degreasing solutions can be regenerated by ultrafiltration, by centrifugal separators, and by annular chamber deoilers. Ultrafiltration is, above all, expensive and relies heavily on machinery. With centrifugal separators and annular chamber deoilers, however, it is only possible to regenerate degreasing solutions in which the oils and impurities are not in the form of stable emulsions. In many instances, oils and drawing compounds which contain anionic emulsifiers and which, without the assistance of the cleaning agent, form stable emulsions that cannot be demulsified by physical processes, are washed off and entrained into the bath solution.

Chemical demulsification processes, i.e. processes in which emulsions are separated into their components, are known for example from U.S. Pat. No. 4,029,708 which describes linear, surface-active anionic or acid-neutralized polymers which are formed by polymerization of substituted oligoamines, such as for example ethylene diamine or diethylene triamine, and bifunctional reagents, such as for example epichlorhydrin or 1,4-dichloro-2-butene. However, emulsions containing alkalis and/or anionic surfactants cannot be demulsified by these polymers.

According to British Pat. No. 1,509,042, processes for removing oils and solvents from effluents by means of mixtures of ionic starch derivatives and flocculants of opposite ionity also result in the separation of organic materials from aqueous solutions. However, if oils or organic solvents are stably emulsified in the effluents, the effect of the described mixtures of starch derivatives and flocculants is greatly reduced or even eliminated altogether because the adsorptive addition of the starch derivatives onto the organic effluent constituents to be removed and subsequent coagulation by the flocculants disclosed in the above patent is only possible when the organic substances are "freely" suspended in the water and not surrounded by emulsifier molecules. Accordingly, before separation from the contaminated waters can take place, any emulsions present first have to be broken.

In most cases, however, aqueous solutions for cleaning and degreasing metal surfaces on an industrial scale not only have neutral to alkaline pH-values, but are also contaminated by emulsified mineral and/or natural oils, particularly by oils and fats which, following the addition of appropriate emulsifiers, have a self-emulsifing effect. The emulsifiers are predominantly anionic in character. In addition, the cleaning and degreasing solutions frequently contain alkalis, such as alkali metal hydroxides, alkali metal carbonates and alkali metal borates, silicates and phosphates, and also complexing agents, such as complexing phosphonic acids or phosphonocarboxylic acids, particularly 1-hydroxy alkane-1,1-diphosphonic acid, 1-aminoalkane-1, 1-diphosphonic acid or aminotrimethylene triphosphonic acid or their alkali metal salts and, frequently, inorganic and organic corrosion inhibitors.

Hitherto, it has not been possible for contaminated cleaning solutions such as these to be readily freed from oils or other organic contaminants.

DESCRIPTION OF THE INVENTION

The object of the present invention is to enable the contaminants discussed above to be readily removed from the cleaning solutions.

It has now been discovered that alkaline and neutral cleaning solutions contaminated by emulsified mineral and/or natural oils can easily be regenerated by chemical processes.

The process according to the invention is carried out by the addition of cationic surfactants and/or cationic polymers or cationically modified polymers as demulsifiers to the contaminated cleaning solutions. When the term "cationic polymers" is used hereinafter, it is to be understood to include cationically modified polymers.

Cations containing substituents R with a low number of carbon atoms on the nitrogen, such as tetramethylammonium or tetraethylammonium compounds, cannot be used in the process of the invention. Instead, the cationic surfactants used are ammonium compounds corresponding to the following formula:

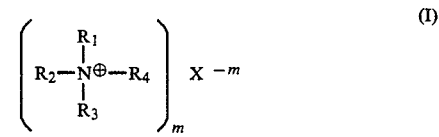

(I)

wherein $R_1$, $R_2$ and $R_3$ are $C_1$–$C_{20}$ alkyl, aralkyl which is preferably phenyl lower alkyl, hydroxy-$C_1$–$C_6$ alkyl, aryl which is preferably phenyl or naphthyl, (provided that only one of $R_1$, $R_2$ and $R_3$ can have more than 6 carbon atoms), or $R_1$, $R_2$ and $R_3$ are all —(CH$_2$CH$_2$O)$_n$H groups where n=1 to 6, or $R_1$, $R_2$ and $R_3$ taken together with the nitrogen atom form the pyridinio group ($C_5H_5N^{\oplus}$ —); $R_4$ is an alkyl group, optionally substituted in the 2-position with a hydroxyl group, having at least 10 carbon atoms, preferably from 10 to 20 carbon atoms, and more preferably from 12 to 16 carbon atoms; the anion X is hydroxide, chloride, bromide, sulfate, nitrate, phosphate, or, preferably, borate; and m is a number equivalent to the valence of the anion X.

Preferred compounds of formula I are those where one and preferably two of the $R_1$, $R_2$ and $R_3$ groups is either a $C_1$–$C_2$ alkyl or a $C_1$–$C_2$ hydroxyalkyl group. Most preferred are compounds of formula I in which $R_1$ and $R_2$ represent methyl, $R_3$ represents methyl, hydroxyethyl, benzyl, 2-hydroxydodecyl or 2-hydroxyhexadecyl, and $R_4$ represents 2-hydroxydodecyl, 2-hydroxyhexadecyl, lauryl, hexadecyl or stearyl.

The cationic polymers that can be used in the present invention can be any nitrogen-containing polymers which are either cationically modified by protonation or alkylation, generally methylation, of the nitrogen or which are converted into the corresponding ammonium salts. The degree of cationic modification is variable and depends upon the neutral starting polymer and upon the corresponding acid agent.

Examples of cationic polymers which can be used alone or in conjunction with cationic surfactants in the process of the invention are protonated quaternary polymers of N-substituted (N',N'-dialkylaminoalkyl)-acrylamides, N,N-dialkylaminoalkylacrylates, diallylamines, or vinyl pyridine; and also methylated quaternary polymers, such as polydiallyl dimethylammonium chlorides or poly-N-methylvinylpyridinium chlorides.

The molecular weights of the cationic polymers used in the process of the invention are in the range of from about $5 \times 10^4$ to about $5 \times 10^7$, and are preferably in the range of from about $7.5 \times 10^4$ to about $5 \times 10^6$. It is preferred to use protonated polyethylene imine (25% AS), methylated polyethylene imine (25% AS) or protonated N,N-dimethylaminoethylacrylate/acrylamide copolymer (100% AS).

The above-mentioned cationic surfactants can be added to the contaminated cleaning solutions either as such or in combination with a nitrogen-containing cationic polymer. The cationic surfactants or surfactant-polymer combinations are added to the cleaning solutions contaminated by oils and anionic emulsifiers at a temperature in the range of from about room temperature to about 80° C., upon which the emulsions are almost instantaneously broken. The oil which precipitates is separated off (for example by a separator or annular chamber deoiler) and the regenerated cleaning solutions returned to the cleaning bath.

That percentage of the cleaning solution which is lost as a result of regeneration is restored as needed by adding water and restrengthening with fresh inorganic cleaning solution components to the desired solution concentrations. The cleaning solution is almost always fully effective again. It is only in isolated instances that the content of organic substances, particularly the surfactant content, has to be supplemented. Regeneration is not accompanied by any change in the pH-value of the cleaning solution, which if such changes occurred would result in a reduction in its effectiveness. The regeneration process can be repeatedly carried out with the same cleaning solution after recontamination.

The cationic demulsifiers can be added to the treatment solution either as such or together with a small quantity, e.g. from about 0.1 to about 10 g/l, based on the volume of contaminated cleaning solution, of non-ionic defoaming agents in order to avoid troublesome foam should the demulsifier be used in excess. This is particularly important where the treatment solution is applied by spraying.

Examples of known defoaming agents are block polymers of ethylene oxide and propylene oxide and also adducts of ethylene oxide and propylene oxide with ethylene diamine or fatty alcohols.

Accordingly, no effluent is formed. The corrosion-inhibiting effect, particularly of neutral cleaning solutions, remains intact if the anions of the cations are, for example, borates or phosphates. Any solids that might form in the process are filtered out through sieves.

The cationic demulsifiers can be used in quantities depending on the particular application. For example, they can be used in a sub-stoichiometric quantity to maintain a residual oil content if desired, or in a stoichiometric excess to obtain as complete and as rapid a separation of the oils as possible. Generally, from about 0.5 to about 2 equivalents, preferably about 1 equivalent of cationic demulsifier is added per equivalent of entrained anionic emulsifiers in the cleaning solution.

The process according to the invention is illustrated by the following Examples, which are given for illustration purposes only and not for purposes of limitation.

The tests to which the Examples relate were carried out with two standard commercial, strongly self-emulsifying drilling oils containing predominantly anionic emulsifiers:

Drilling oil 1

5.43 mMoles of petroleum sulfonates/100 g
17.14 mMoles of soap/100 g

Drilling oil 2

7.43 mMoles of petroleum sulfonates/100 g
15.71 mMoles of soap/100 g

The name and number of the demulsifiers tested are shown in the following Table.

| Demulsifier | | |
|---|---|---|
| 1 lauryl-dimethyl-benzylammonium-chloride | 35% | AS |
| 2 protonated polyethylene-imine-chloride | 25% | AS |
| 3 2-hydroxyhexadecyl-dimethylethanol ammonium-borate | 25% | AS |
| 4 2-hydroxydodecyl-dimethylethanol-ammonium borate | 25% | AS |
| 5 tetramethylammonium-hydroxide | 10% | AS |
| 6 tetraethylammonium-hydroxide | 20% | AS |
| 7 bis-[(2-hydroxydodecyl)-dimethyl-(2-hydroxyethyl)-ammonium]-hydrogen phosphate | 32.2% | AS |
| 8 tris-[(2-hydroxydodecyl)-dimethyl-(2-hydroxyethyl)-ammoniaum]-hydrogen-phosphate | 30.6% | AS |
| 9 methylated polyethylene-imine-chloride | 25% | AS |
| 10 protonated N,N—dimethyl-aminoethyl-acrylate-acrylamide-copolymer (in the form of the chloride) | 100% | AS |
| 11 lauryl-pyridinium-bisulfate | 54% | AS |
| 12 tris-(oligooxyethyl)-alkylammonium-hydroxide alkyl radical R = $C_{16}$–$C_{18}$ total EO content = 10EO | 50% | AS |

(AS = active substance)

EXAMPLE 1

Neutral Cleaner

Breaking in the presence of a neutral cleaner consisting of
- 35% of alkanolamine $-C_8-C_{12}-$carboxylate,
- 2% of 1-hydroxy-ethane-1,1-diphosphonic-acid,
- 0.5% of mercaptobenzthiazole,
- 3% of a block polymer of ethylene diamine +30 moles of
- ethylene oxide and 60 moles of propylene oxide,
- 1% of the adduct of 10 moles of ethylene oxide with $C_{12}-C_{16}-$fatty amine,
- 8.5% of water is described in the following:

a. Emulsion Breaking

Emulsion breaking was carried out by the following test:

10 g of drilling oil were emulsified at room temperature with 40 g of a 2% aqueous solution of the above neutral cleaner in a 270 ml-capacity oil separation flask. An equivalent quantity of a cationic demulsifier was then added. While shaking, 2% hot neutral cleaner solution was added until the flask was filled. Breaking began spontaneously. To complete the separation of oil from the "emulsion-like phase" initially precipitating, the liquid was maintained for 2 hours at 80° C. The test was carried out as above with each of the demulsifiers 1 through 12.

Results

Only with tetramethylammonium hydroxide and tetraethylammonium hydroxide was no separation (even partial) observed. The remaining test substances separated the emulsion completely. The oil was separated off substantially quantitatively (residual oil content less then 140 ppm in each case).

b. Corrosion Inhibition

Corrosion inhibition was tested in accordance with DIN 51 360/2. 2 g of gray iron turnings (GG 30 corresponding 9 to DIN 1691) were distributed in a circle of d=5 on a filter paper (D=9 cm) and wetted with 2 ml of test liquid in a Petri dish. The Petri dish was then closed. After 2 hours, the turnings were removed from the filter, with rust spots being visible (or not) depending on the concentration.

To carry out the test, 1%, 2% and 3% solutions of the above neutral cleaner in water (hardness=20°d) were mixed with 1% of drilling oil 1 or 2, followed by the addition of cationic demulsifier. After 2 hours, the corrosion-inhibiting effect of the aqueous phases was determined.

Results

The corrosion-inhibiting effect of the regenerated solutions was as good as that of the original neutral cleaning solutions. Only with demulsifiers 1 and 2 was any weakening in the corrosion-inhibiting effect observed.

c. Addition of Defoaming Agents 10 g of drilling oil 2 were emulsified at room temperature with 40 g of a 2% aqueous solution of the above neutral cleaner in a 270 ml capacity oil separation flask. The cationic demulsifier was added to this emulsion in a stoichiometric excess (ratio of demulsifier to anionic emulsifier=1.2:1). In addition, the adduct of 30 moles of ethylene oxide and 60 moles of propylene oxide with ethylene diamine was added as defoaming agent (ratio of demulsifier to defoaming agent=1:1). A 2% solution of the above fresh aqueous neutral cleaner was then added while shaking until the flask was full. Breaking began spontaneously. The residual oil content amounted to less than 120 ppm. The recycled cleaning solution could then be sprayed without foaming.

EXAMPLES 2 TO 4

Alkaline Cleaning Agents

These examples describe the breaking of emulsions in the presence of alkaline cleaning agents having the composition indicated at the beginning of each of the Examples:

EXAMPLE 2

- 63% of sodium metasilicate
- 14% of sodium hydroxide
- 15% of soda
- 2% of adduct of fatty alcohol +14 ethylene oxide
- 3% of alkyl benzene sulfonate 2% of drilling oil concentrate were emulsified at room temperature in a 4% cleaning solution in tap water, a more than equivalent quantity (1:1.1) of demulsifier 8 was added and the whole stirred thoroughly for about 3 minutes. The mixture was left standing, and the oil began to separate immediately. After 1 hour, the almost clear, aqueous phase contained only 97 ppm of oil.

EXAMPLE 3

- 60% of sodium metasilicate
- 10% of sodium hydroxide
- 15% of soda
- 10% of sodium diphosphate
- 2.5% of adduct of fatty alcohol +14 ethylene oxide
- 2.5% of adduct of coconut oil fatty acid amine +12 ethyl ene oxide.

As described in EXAMPLE 2, twice the equivalent quantities of demulsifiers 1 and 7 were added to 3% solution of the above cleaner to obtain demulsification. Separation began immediately, the aqueous phase being almost clear. Residual oil content 85 ppm and 123 ppm, respectively.

EXAMPLE 4

- 50% of sodium diphosphate
- 15% of sodium triphosphate
- 15% of trisodium phosphate
- 10% of soda
- 7.7% of adduct of nonylphenol +14 ethylene oxide
- 2.3% of adduct of coconut oil fatty acid monoethanolamide +4 ethylene oxide.

As in EXAMPLES 2 and 3, twice the equivalent quantities of demulsifiers 7 and 8 were added to contaminated 2% cleaning solutions of the above cleaner. Separation began immediately; the aqueous phase being almost clear. Residual oil content was 157 ppm and 106 ppm, respectively. The presence of pyro- or polyphosphates and/or anionic surfactants necessitated a larger addition of demulsifier for complete and rapid demulsification.

What is claimed is:

1. A process for regenerating aqueous alkaline or neutral degreasing and cleaning solutions contaminated with an emulsified oil containing an anionic emulsifier comprising adding thereto an effective quantity of a cationic demulsifier which is a nitrogen-containing cationically modified polymer wherein the cationic modification is by either protonation or alkylation, and wherein the polymer consists essentially of polyethylene imine or a methylated polymer of ethylene imine.

2. A process in accordance with claim 1 wherein the cationically modified polymer has a molecular weight of from about $5 \times 10^4$ to about $5 \times 10^7$.

3. A process in accordance with claim 1 wherein the molecular weight is from about $7.5 \times 10^4$ to about $5 \times 10^6$.

4. A process in accordance with claim 1 wherein an effective quantity of a defoaming agent is also added to the contaminated cleaning solution.

5. A process in accordance with claim 1 wherein the process is carried out at a temperature of from about room temperature to about 80° C.

6. A process in accordance with claim 1 wherein from about 0.5 to about 2 equivalents of cationic demulsifier is added per equivalent of anionic emulsifier present in the contaminated solution.

7. A process in accordance with claim 1 wherein about 1 equivalent of cationic demulsifier is added per equivalent of anionic demulsifier.

* * * * *